(12) United States Patent
Zhengdi (10) Patent No.: US 7,466,752 B2
(45) Date of Patent: Dec. 16, 2008

(54) DETERMINATION OF THE POSITION OF A PULSE PEAK

(75) Inventor: Qin Zhengdi, Tampere (FI)

(73) Assignee: Nokia Corporation, Espoo (FI)

( * ) Notice: Subject to any disclaimer, the term of this patent is extended or adjusted under 35 U.S.C. 154(b) by 733 days.

(21) Appl. No.: 10/727,152

(22) Filed: Dec. 2, 2003

(65) Prior Publication Data

US 2004/0147239 A1 Jul. 29, 2004

(30) Foreign Application Priority Data

Dec. 2, 2002 (WO) .................. PCT/IB02/05059

(51) Int. Cl.
*H03K 7/04* (2006.01)
*H04B 1/00* (2006.01)

(52) U.S. Cl. .............. 375/239; 375/130; 375/150; 375/152; 375/316; 375/324; 375/343

(58) Field of Classification Search .......... 375/239, 375/200, 202, 206, 140–142, 146–147, 160, 375/316, 322, 324, 343, 130, 150, 152; 370/335, 370/342, 441; 455/343, 524, 384, 226.1, 455/130

See application file for complete search history.

(56) References Cited

U.S. PATENT DOCUMENTS

| | | | | |
|---|---|---|---|---|
| 5,896,304 A | * | 4/1999 | Tiemann et al. | 708/5 |
| 5,982,811 A | * | 11/1999 | Harrison et al. | 375/150 |
| 6,118,808 A | * | 9/2000 | Tiemann et al. | 375/142 |
| 6,407,699 B1 | * | 6/2002 | Yang | 342/357.12 |
| 6,633,255 B2 | * | 10/2003 | Krasner | 342/357.12 |
| 7,006,556 B2 | * | 2/2006 | Abraham et al. | 375/142 |
| 7,096,132 B2 | * | 8/2006 | Patrick et al. | 702/66 |
| 7,200,162 B2 | * | 4/2007 | Kang et al. | 375/147 |
| 2003/0043889 A1 | * | 3/2003 | Kang et al. | 375/147 |
| 2003/0123408 A1 | * | 7/2003 | Saitou | 370/335 |

FOREIGN PATENT DOCUMENTS

EP 1089452 * 4/2001

OTHER PUBLICATIONS

"Curve Fitting Toolbox" User's Guide Version 1, Jul. 2001, Chapter 3.*
"An Efficient Hilbert Transform Interpolation Algorithm for Peak Position Estimation" by S. Abeysekera, 11th IEEE Workshop on Statistical Signal Processing, Singapore, Aug. 6-8, 2001, pp. 417-420.

* cited by examiner

*Primary Examiner*—Mohammad Ghayour
*Assistant Examiner*—Sophia Vlahos (57) ABSTRACT

The invention relates to a method for determining the position $x_p$ of a peak of a pulse in a signal received at a receiver. In order to improve the accuracy of this determination, the method comprises taking samples of said received signal, determining at least three samples, at least one of which has a signal strength exceeding a threshold value, and determining the position $x_p$ of the pulse peak based on an interpolation of at least two of the determined samples, which at least two samples are selected based on the signal strengths of the at least three determined samples, and which interpolation includes an evaluation of the signal strength of the at least two samples. The invention relates equally to a device and to a cellular communication system comprising means for realizing this method.

25 Claims, 4 Drawing Sheets

DETERMINATION OF THE POSITION OF A PULSE PEAK

CROSS-REFERENCE TO RELATED APPLICATION

This application claims priority from International Application Ser. No. PCT/IB02/05059 filed Dec. 2, 2002.

BACKGROUND OF THE INVENTION

The invention relates to a method for determining the position of the peak of a pulse in a signal received at a receiver. The invention relates equally to a device and to a cellular communication system which realize this method.

The position of the peak of a pulse in a received signal can be required for example for determining the delay of the signal when propagating from a transmitting unit to the receiver.

The delay of signals at a receiver can be evaluated for instance by a location service for determining the current location of the receiver. In case of a line-of-sight transmission, the delay of a signal is directly dependent on the distance between the receiver and the respective transmitting unit.

Such a location service can be provided in particular by a CDMA (code division multiple access) based satellite positioning system or by a CDMA based terrestrial cellular positioning system. In a CDMA based system, a data sequence is used by a transmitting unit to modulate a sinusoidal carrier, and then the bandwidth of the resulting signal is spread to a larger value, e.g. by multiplying the modulated signal with pseudo-random bits derived from a CDMA spreading code. These bits are usually referred to as chips.

In a CDMA system, the searching procedure performed for detecting a delayed signal taking the shortest propagation path is normally carried out in the impulse response of signals received from different transmitting units. The delay can be estimated e.g. by an edge detection in the impulse response profile of the received signals. The length of the impulse response profile is much longer than the width of the signal shape. Therefore, the search for an edge is performed along the impulse response, started from a certain position of the signal by comparing the amplitude of sampling data with a pre-defined threshold. The edge detection is thus a hitting process. The threshold has to be set on the one hand high enough in order to avoid that a noise peak is detected as signal edge, which would result in a false alarm. On the other hand, the threshold has to be set low enough to guarantee that the signal edge is detected even if the signal strength is rather weak.

The delay of a signal can only be determined accurately when the exact position of the peak of a signal pulse is known since this is the only clear reference point in the pulse. The result of the hitting process, however, is usually a position on the left side of the signal peak, i.e. on the side which is closer to a delay of zero, since a pulse will usually be detected before its peak is reached. Thus, the error of the edge detection is negatively biased. The error is more related to the signal than to the SNR (signal-to-noise ratio), which means that the variance can be high. The hit will occur between close to the peak of the pulse for weak signals and close to the bottom of the pulse for strong signals.

In case of a sampling rate of 2 samples per chip, the delay estimation error can therefore range from 0.0 chips to −1.0 chips. The average error is then about −0.5 chip for a triangular shape or waveform of the pulse.

Since the error has a negative bias, the simplest way to reduce the error is to introduce a positive factor to compensate for the bias. If the signal level is higher, the error is also bigger. Therefore, the compensation factor should be adaptive to the signal level. Still, with such a general compensation, a significant average error remains.

SUMMARY OF THE INVENTION

It is an object of the invention to improve the accuracy of the determined position of the peak of a pulse.

This object is reached according to the invention with a method for determining the position of a peak of a pulse in a signal received at a receiver, which method comprises as a first step taking samples of the received signal. In a next step, at least three samples are determined, of which at least one has a signal strength exceeding a threshold value. The samples can, but do not have to be consecutive. Then, the position of the pulse peak is determined based on an interpolation of at least two of the determined samples. These at least two samples are selected based on the signal strengths of the at least three determined samples. It is further proposed that the interpolation includes an evaluation of the signal strength of the at least two samples.

The object of the invention is moreover reached with a device comprising means for realizing the proposed method. The device can be for example the receiver, i.e. the receiver itself computes the position of received pulse peaks. Alternatively, the device can be external to the receiver. In this case, the receiver has to provide information on received signals to this device, in order to enable the device to perform the proposed processing. In case the receiver is a mobile terminal or integrated in a mobile terminal, such an external device can be in particular a network element of a cellular communication network. Finally, the object of the invention is reached with a cellular communication system comprising the proposed device.

The invention proceeds from the idea that the position of a pulse peak can be determined more accurately, if the position is not determined simply by an edge detection searching for a single sample which exceeds a threshold value, but by an interpolation of at least two samples, of which at least one exceeds a threshold value. The proposed interpolation evaluates the signal strengths of the samples used for the interpolation, thereby taking account of the difference in the distance of the samples from the peak of the pulse. In addition, the at least two samples can be selected in most cases such that they can be assumed to lie advantageously on opposite sides of the pulse peak, if the signal strength from an appropriate number of samples is taken into account.

It is an advantage of the invention that the estimation accuracy of the position of the peak is increased. Thereby, e.g. the delay of received signals can be estimated more accurately.

Advantageously, the equations for the interpolation are selected based on the employed model of the pulse shape. For example, in case the model of the pulse shape is a triangle, a linear relation between the distance of the samples to the peak position and the signal strengths of the samples can be assumed for the interpolation.

A model of the pulse shape which has a triangular shape results in a particularly simple approach. Even though in practice the real pulse shape will usually not correspond to a triangle, the triangle approach leads to quite accurate peak position estimates for other band-limited signal pulse shapes as well. While different pulse shapes have a different behavior in the delay estimation, the interpolation itself is a shape-fitting procedure.

In order to compensate in addition for the differences between the selected model and the real pulse shape, either the samples used in the interpolation can be weighted with different weighting coefficients or the resulting estimate can be adjusted. The compensation can be based on known deviations between the model of the pulse shape and the real pulse shape and/or on the signal strength of samples.

Preferably, the method according to the invention differentiates between different situations that may occur. Thereby, the optimal samples can be selected for the interpolation in each situation. With such a differentiation, the method according to the invention is also suited to deal with multipath propagation of signals. The differentiation can be based in particular on the differences in the successions of the signal strengths of the considered samples.

The invention can be employed e.g. for supporting the acquisition of signals, for instance in any kind of location service.

It can be used in particular, though not exclusively, for determining the delay of signals in a satellite positioning system or in a cellular positioning system. The satellite positioning system can be for instance GPS (global positioning system) or Galileo, while the cellular positioning system can be implemented for example in a 3G (3rd generation) communication system, a GSM (global system for mobile communications), or a CDMA and/or GPRS (general packet radio system) system.

BRIEF DESCRIPTION OF THE FIGURES

Other objects, features and advantages of the present invention will become apparent from the following detailed description considered in conjunction with the accompanying drawings, wherein.

DETAILED DESCRIPTION OF THE INVENTION

Figure 1:
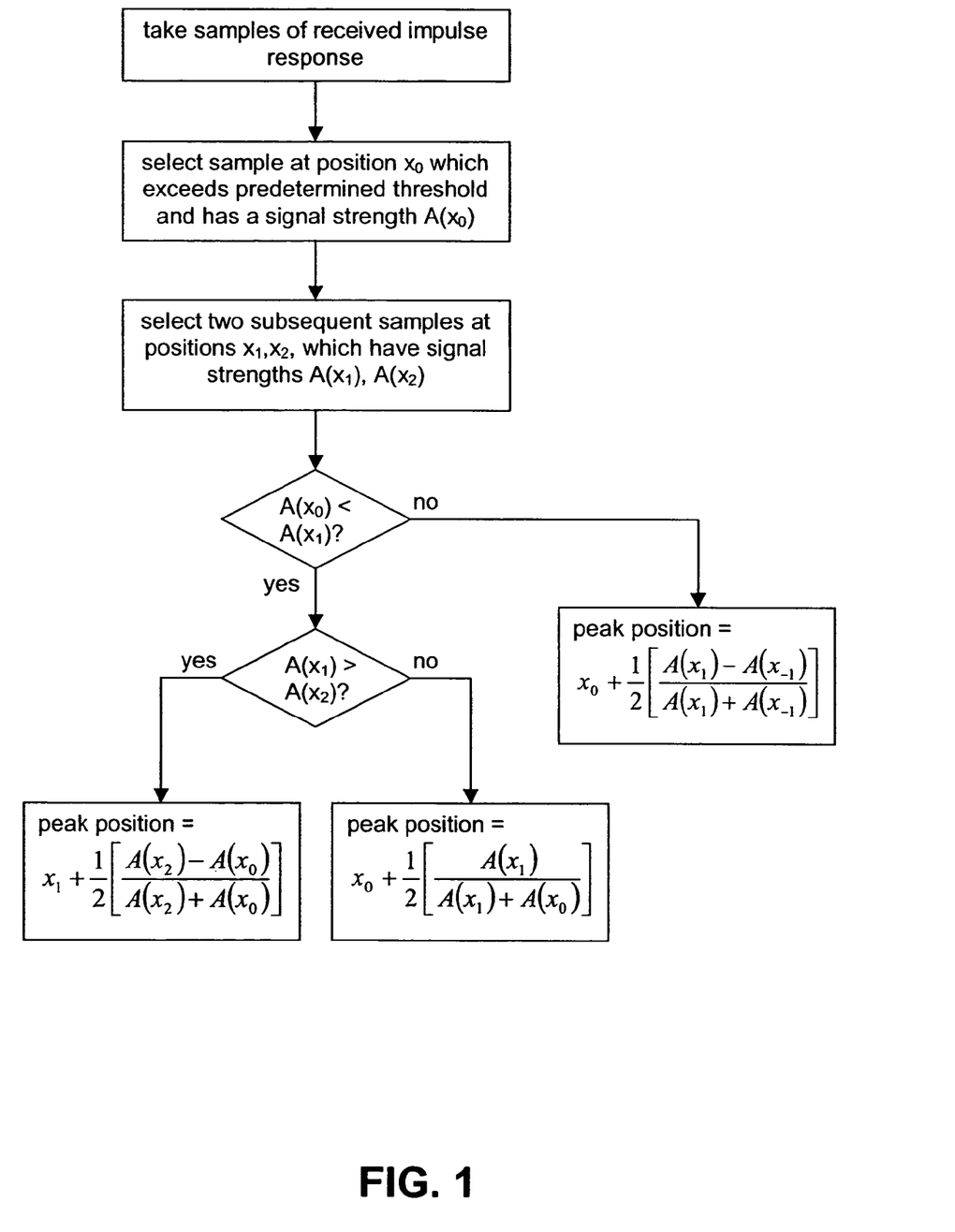
FIG. 1 is a flow chart illustrating an embodiment of the method according to the invention.

FIG. 1 is a flow chart which illustrate a first embodiment of the method according to the invention, which is implemented in an exemplary CDMA system. The CDMA system comprises a plurality of base stations of a cellular communication network and a mobile station which is able to communicate via the air interface with these base stations. The method is used for estimating at the mobile station the delay of signals received from some of the base stations, in order to determine the current position of the mobile station.

Figure 2:
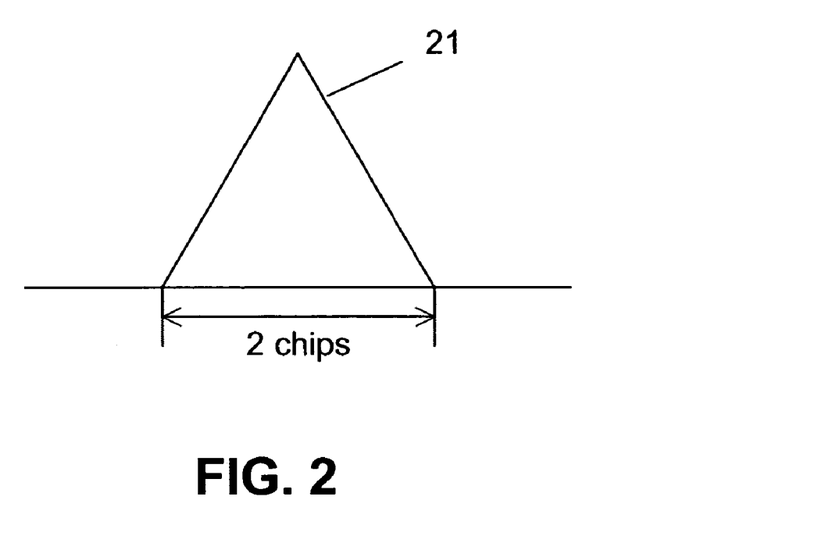
FIG. 2 shows an exemplary model of a pulse shape employed in the method of FIG. 1.

For the method of FIG. 1, the pulse shape in the impulse response of a received CDMA signal, which has passed a matched filter, is supposed to be triangular and is thus also modeled to be triangular. The triangular model is depicted in FIG. 2. The triangle 21 is isosceles and has a duration of 2 chips, since the coverage of a peak in a CDMA system is 2 chips.

In a first step in the method of FIG. 1, samples are taken at the mobile station from the impulse response with a sampling rate of two samples per chip. Obviously, a sampling rate of more than two samples per chip could be used as well. In this case, however, the equations presented in the following would have to be adjusted accordingly. The steps shown in the flow-chart are to be understood as corresponding to means or components for carrying out the method.

The taken samples are then compared to a predetermined threshold value, starting at a position which corresponds to a delay of zero. The threshold value is selected such that the false alarm rate is below a desired value, while it is ensured at the same time that a real peak is detected with a desired probability. The threshold value may be varied to this end based e.g. on the signal strength of received signals.

The first sample at a position $x_0$ which exceeds the threshold value is considered as a "hit", i.e. as a detection of the edge of the signal pulse in the impulse response which took the shortest propagation path.

In the following, a differentiation between three possible situations is carried out.

In case the strength $A(x_0)$ of the first sample at position $x_0$ is smaller than the strength $A(x_1)$ of the second sample at position $x_1$, there are two possible situations.

In the first possible situation $S_1$, the strength $A(x_1)$ of the second signal at position $x_1$ is larger than the strength $A(x_2)$ of the third signal at position $x_2$. The first situation $S_1$ is thus give by the following set:

$$S_1 \in [A(x_0) < A(x_1)] \cap [A(x_1) \geq A(x_2)]$$

In the first situation, a single path has been detected, and the peak is located somewhere between position $x_0$ and position $x_2$. In this case, the three values $A(x_0)$, $A(x_1)$ and $A(x_2)$ can be used for an interpolation to find a more accurate peak position.

Figure 3:
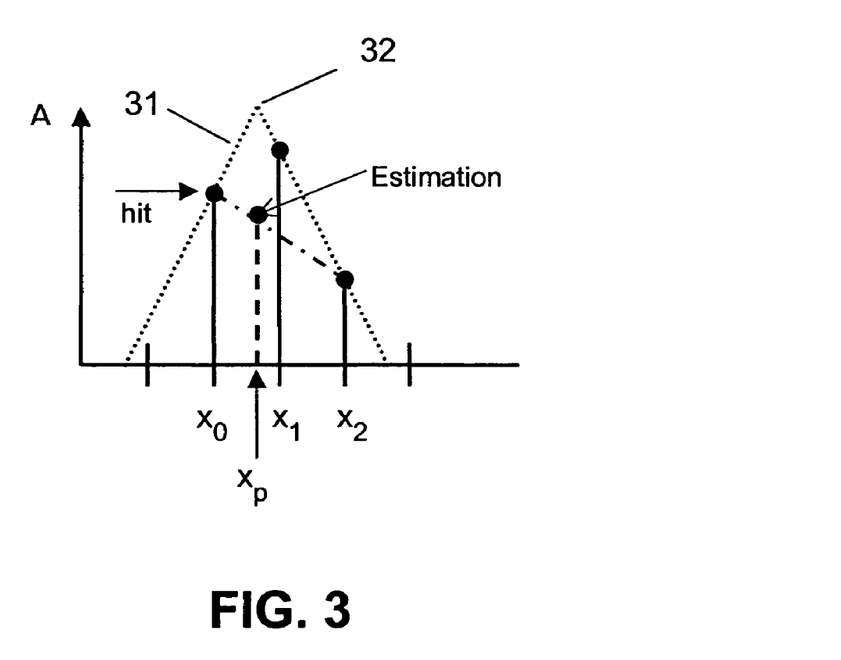
FIG. 3 illustrates a first situation dealt with in the method of FIG. 1.

An example for this situation is illustrated in FIG. 3. The figure is a diagram depicting the strength A of the three samples at the respective position $x_0$, $x_1$, $x_2$ of the samples. In addition, the triangular model 31 of the pulse shape is indicated with dotted lines. The signal strength of the three samples is equal to the value of the triangle at the corresponding position. It can be seen that the first sample is positioned on the left hand side of the peak 32, while the second and the third sample are located on the right hand side of the peak 32. In another example for this situation, the second sample could also be located on the left hand side of the peak. A zero delay is somewhere to the left of the triangle 31.

For the interpolation, the "early minus late" technique can be applied. With this technique, the estimated peak position $x_p$, and thus the delay, is given by:

$$x_1 + \frac{1}{2}\left[\frac{A(x_2) - A(x_0)}{A(x_2) + A(x_0)}\right],$$

where the unit of second term is chips.

In FIG. 3, the estimation of the peak position $x_p$ resulting for the depicted example is indicated. If the signal is strong, a perfect interpolation for the delay estimation can be obtained. The error is SNR dependent.

In the second possible situation $S_2$, in contrast, the strength $A(x_1)$ of the second signal at position $x_1$ is smaller than the strength $A(x_2)$ of the third signal at position $x_2$. The second situation $S_2$ is thus give by the following set:

$$S_2 \in [A(x_0) < A(x_1)] \cap [A(x_1) < A(x_2)]$$

Such a distribution of sample strengths is indicative of a multipath propagation resulting in a so-called "fat finger".

The second situation results more specifically, when a pulse transmitted by a base station propagates via several paths to the mobile station, and the first pulse arriving at the mobile station, e.g. a pulse which propagated on a line-of-sight path, is followed in an overlapping manner by a second pulse.

Figure 4:
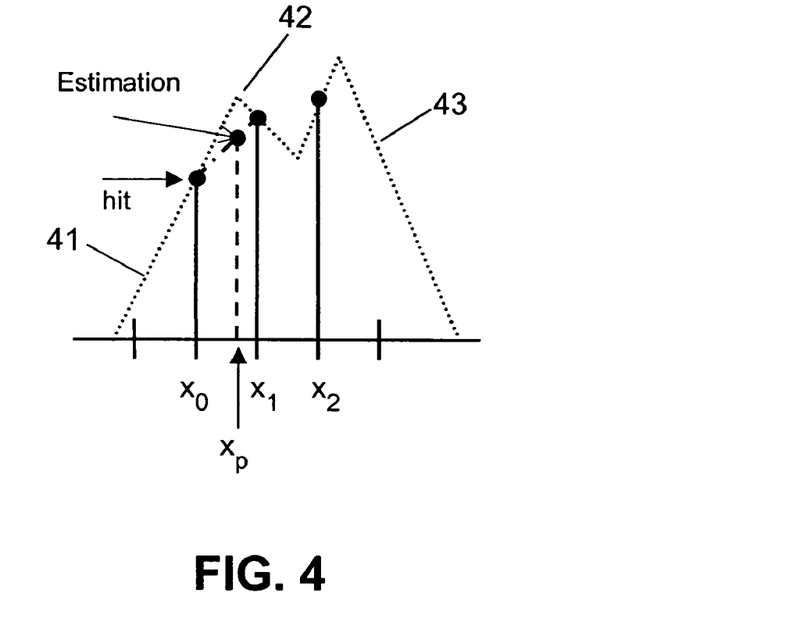
FIG. 4 illustrates a second situation in the method of FIG. 1.

An example for the second situation is illustrated in FIG. 4. FIG. 4 is again a diagram depicting the strength of the three samples at the respective position $x_0$, $x_1$, $x_2$ of the samples. Here, two overlapping triangles 41, 43, each modeling a pulse arriving at the mobile station, are indicated in addition with dotted lines. The first sample, having a signal strength of $A(x_0)$, is positioned on the left hand side of the peak 42 of the first pulse 41 at position $x_0$, and the second sample, having a signal strength of $A(x_1)$, is positioned on the right hand side of the peak 42 of the first pulse 41 at position $x_1$. The strength $A(x_2)$ of the subsequent third sample at position $x_2$ is larger than the strength $A(x_1)$ of the second sample, since it comprises a component of the second pulse 43 on the left hand side of a peak thereof.

Therefore, the value of the third sample at position $x_2$ is not reliable. Nevertheless, the first and the second sample can be used to reduce the inaccuracy of the first sample. The position $x_p$ of the peak 42 of the first pulse 41 can be estimated by:

$$x_0 + \frac{1}{2}\left[\frac{A(x_1)}{A(x_1) + A(x_0)}\right],$$

where the unit of second term is chips.

For this estimation, there are two error bonds given by the two extreme cases. In the first extreme case, the position $x_0$ of the first sample is near the top 42 of the first triangle 41, and the maximum error caused by the lack of information on a reliable third sample is +0.25 chips. In the second extreme case, the position $x_0$ of the first sample is near the foot of the first triangle 41, and the maximum error caused by the lack of information on a reliable third sample is −0.25 chips.

The multipath interference may cause an additional error of +0.25 chips in the maximum, when the hit is near the top of the first path signal and the following path signal is very strong, i.e. $A(x_1) \gg A(x_0)$. This multipath error in the delay estimation is always positive.

In case the strength $A(x_0)$ of the first signal at position $x_0$ is not smaller than the strength $A(x_1)$ of the second signal at position $x_1$, the third possible situation $S_3$ is given, which can be expressed by the following:

$$S_3 \in [A(x_0) \geq A(x_1)]$$

In this third situation, the first sample at position $x_0$ can be assumed to be close to the peak. Still, the first sample might not be positioned exactly at the position of the peak.

Figure 5:
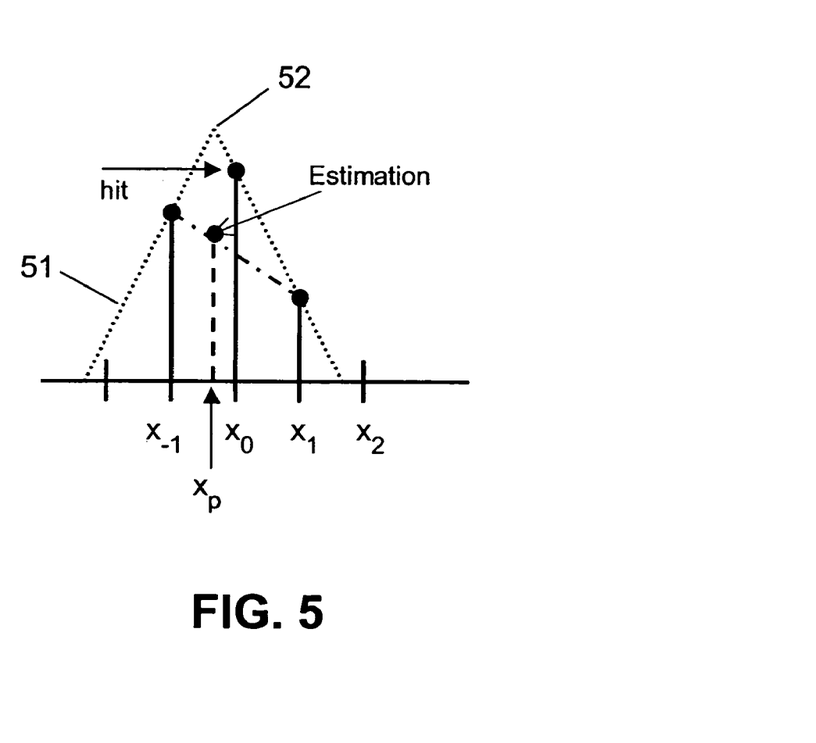
FIG. 5 illustrates a third situation in the method of FIG. 1.

An example for the third situation is illustrated in FIG. 5. The figure is a diagram depicting the strength of the three samples at their positions $x_0$, $x_1$, $x_2$. In addition, a triangular model 51 of the pulse shape is indicated again with dotted lines. It can be seen that all three samples are positioned on the right hand side of the peak 52 of the triangle 51. The third sample at position $x_2$ did not result in a signal strength exceeding the predetermined threshold value.

In order to obtain an information on the exact peak position $x_p$, it has to be ensured that information from both sides of the peak 52 is available. To this end, in addition an earlier sample at position $x_{-1}$ is taken into account. The signal strength $A(x_{-1})$ of the preceding sample at position $x_{-1}$ is indicated in FIG. 5 as well. The interpolation is then carried out between the earlier sample position $x_{-1}$ and the second sample at position $x_1$. Thereby, the situation corresponds basically to the first described situation.

As in the first situation, the "early minus late" technique can be applied for the interpolation. The estimated peak position $x_p$ is then given by:

$$x_0 + \frac{1}{2}\left[\frac{A(x_1) - A(x_{-1})}{A(x_1) + A(x_{-1})}\right],$$

where the unit of second term is chips.

In the example of FIG. 5, the resulting estimation for the peak position $x_p$ lies between position $x_{-1}$ and position $x_0$.

Summarized, the estimation error can be limited to a value between −0.25 and +0.25 chips with the proposed method in any situation. The multipath error may add with a maximum of +0.25 chips. There is no signal-strength dependent bias required for the estimation. The stronger the signal, the smaller the error. The averaged error can be much smaller than 0.25 chips for strong signals. This corresponds in the case of a cellular 3G network to an estimation accuracy of ±20 m, if there is no multipath propagation, and of −20 m to +40 m in the presence of multipath propagation.

Figure 6:
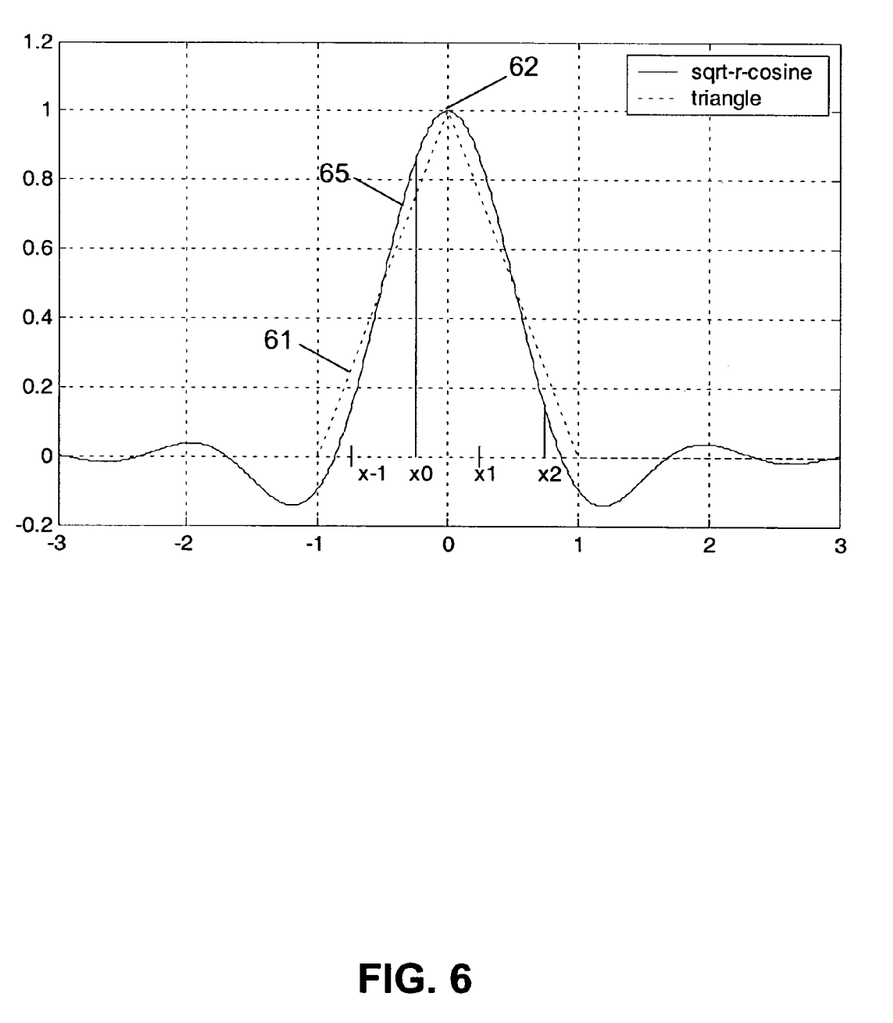
FIG. 6 shows an exemplary real pulse shape together with a model of a pulse shape.

In a second embodiment of the invention, again a triangular model of the pulse shape is used, but the actual pulse shape is known to be a square-root-raised cosine pulse shape, which can be expressed by the following equation:

$$g\left(\frac{t}{T}\right) = C\frac{\cos\left[(1+\beta)\frac{\pi t}{T}\right] + \sin\left[(1-\beta)\frac{\pi t}{T}\right]\left(4\beta\frac{t}{T}\right)^{-1}}{1 - \left(4\beta\frac{t}{T}\right)^2}$$

FIG. 6 shows a corresponding square-root-raised cosine pulse shape 65 with a solid line, and the triangular model 61 with a dashed line. It can be seen that the differences between the two shapes 61, 65 within ±1 chips are quite small. The error caused by the shape differences is less than 5% in this case.

In order to further improve the delay estimation, deviations of the model of the pulse shape 61 from the real pulse shape 65 are taken into account in addition to the steps described with reference to FIG. 1.

More specifically, the samples of which the signal strengths $A(x)$ are is to be used in the interpolation are first weighted with different weighting coefficients compensating for the differences in shape, as will be explained in the following by way of example.

The situation presented in FIG. 6 corresponds basically to the first situation presented in FIG. 3. Thus, a first sample at position $x_0$ and a third sample at position $x_2$ are used for the actual interpolation. The first sample at position $x_0$ has a measured signal strength $A(x_0)$ which exceeds the value of the triangle 61 at this position. Thus, this strength $A(x_0)$ is weighted lower. The third sample at position $x_2$, in contrast, has a measured signal strength $A(x_2)$ which is lower than the value of the triangle 61 at this position. Thus, this strength $A(x_2)$ is weighted higher. As a result, the square-root raised cosine curve is approached to the triangle curve, and the interpolation principle for the triangle can be also applied to the square-root raised cosine pulse shape.

The interpolation is then carried out as described above with reference to FIG. 1 with the weighted samples.

In a third embodiment of the method according to the invention, again a triangular model of the pulse shape is used, and the actual pulse shape is a square-root-raised cosine pulse shape as depicted in FIG. 6.

In this embodiment, however, the position estimate of the pulse peak is first calculated entirely as described with reference to FIG. 1. A compensation of the difference of shapes 61, 65 of the model and the real pulse is only carried out in a subsequent step.

For this compensation, the estimated position $x_p$ is modified based on the amplitudes of the samples on both sides of the peak 62 of the pulse 65, and on the shape of the pulse 65. For instance, when the method described with reference to FIG. 1 is applied to the example of FIG. 6, it results in a negative error. This error can be reduced by a multiplication factor that is produced by the amplitudes of the samples at positions $x_0$, $x_1$ and $x_2$.

It is to be noted that the described embodiment constitutes only one of a variety of possible embodiments of the invention.

The invention claimed is:

1. Method for determining a position of a peak of a pulse in a signal received at a receiver, said method comprising:
   taking samples of said received signal;
   determining at least three samples, of which at least one has a signal strength exceeding a threshold value; and
   determining the position of said pulse peak based on an interpolation of at least two of said determined samples, which at least two samples are selected based on the signal strengths of said at least three determined samples, and which interpolation includes an evaluation of the signal strength of said at least two samples,
   wherein different types of equations for said interpolation are provided for different distributions of the signal strengths of said at least three determined samples.

2. Method according to claim 1, wherein said at least two samples are selected based in addition on a model for a pulse shape.

3. Method according to claim 1, wherein equations for said interpolation are determined based on a model for a pulse shape.

4. Method according to claim 2, wherein said model of said pulse shape has a triangular shape.

5. Method according to claim 4, wherein, in case a signal strength $A(x_0)$ of a determined sample at a first position $x_0$ is smaller than a signal strength $A(x_1)$ of a determined second sample at a following second position $x_1$ and the signal strength $A(x_1)$ of said second sample is larger than a signal strength $A(x_2)$ of a determined third sample at a following third position $x_2$, the position of said peak is estimated to be:

$$x_1 + \frac{1}{2}\left[\frac{A(x_2) - A(x_0)}{A(x_2) + A(x_0)}\right] \text{ chips.}$$

6. Method according to claim 4, wherein said pulse has a width of about two chips, wherein a sampling rate is two samples per chip, and wherein, in case a signal strength $A(x_0)$ of a determined sample at a first position $x_0$ is smaller than a signal strength $A(x_1)$ of a determined second sample at a following second position $x_1$ and the signal strength $A(x_1)$ of said second sample is smaller than a signal strength $A(x_2)$ of a determined third sample at a following third position $x_2$, the position of said peak is estimated to be:

$$x_0 + \frac{1}{2}\left[\frac{A(x_1)}{A(x_1) + A(x_0)}\right] \text{ chips.}$$

7. Method according to claim 4, wherein said pulse has a width of about two chips, wherein a sampling rate is two samples per chip, and wherein, in case a signal strength $A(x_0)$ of a determined sample at a first position $x_0$ is larger than a signal strength $A(x_1)$ of a determined second sample at a following second position $x_1$, the position of said peak is estimated to be:

$$x_0 + \frac{1}{2}\left[\frac{A(x_1) - A(x_{-1})}{A(x_1) + A(x_{-1})}\right] \text{ chips,}$$

wherein $A(x_{-1})$ is a signal strength of a determined third sample preceding said first sample at a third position $x_{-1}$.

8. Method according to claim 3, wherein a weighting of the signal strengths of samples used in said interpolation is performed before said interpolation based on known deviations between said model of said pulse shape and a real pulse shape.

9. Method according to claim 3, wherein a correction of a position determined based on said interpolation is performed based on known deviations between said model of said pulse shape and a real pulse shape and based on the signal strengths of said samples.

10. Method according to claim 1, wherein said at least three samples are consecutive samples.

11. Apparatus comprising;
    a sampling component configured to take samples of a received signal, wherein a position of a peak of a pulse in said signal is to be determined;
    a determination component configured to determine at least three samples, of which at least one has a signal strength exceeding a threshold value; and
    a processing component configured to determine the position of said pulse peak based on an interpolation of at least two of said determined samples, which at least two samples are selected based on the signal strengths of said at least three determined samples. and which interpolation includes an evaluation of the signal strength of said at least two samples, wherein different types of equations for said interpolation are provided for different distributions of the signal strengths of said at least three determined samples.

12. Apparatus according to claim 11, wherein said apparatus is a receiver receiving said signal.

13. Apparatus according to claim 11, wherein said apparatus is a device external to a receiver receiving said signal and comprises further a receiving component configured to receive from said receiver information on said received signal.

14. Apparatus according to claim 13, wherein said apparatus is a network element of a cellular communication system.

15. Cellular communication system comprising an apparatus according to claim 11.

16. Apparatus according to claim 11, wherein said processing component is configured to select said at least two samples based in addition on a model for a pulse shape.

17. Apparatus according to claim 11, wherein said different types of equations for said interpolation have been determined based on a model for a pulse shape.

18. Apparatus according to claim 16, wherein said model of said pulse shape has a triangular shape.

19. Apparatus according to claim 18, wherein said processing component is configured to, in case a signal strength $A(x_0)$ of a determined sample at a first position $x_0$ is smaller than a signal strength $A(x_1)$ of a determined second sample at a following second position $x_1$ and the signal strength $A(x_1)$ of said second sample is larger than a signal strength $A(x_2)$ of a determined third sample at a following third position $x_2$, estimate the position of said peak to be:

$$x_1 + \frac{1}{2}\left[\frac{A(x_2) - A(x_0)}{A(x_2) + A(x_0)}\right] \text{ chips.}$$

20. Apparatus according to claim 18, wherein said pulse has a width of about two chips, wherein a sampling rate is two samples per chip, and wherein said processing component is configured to, in case a signal strength A of a determined sample at a first position $x_0$ is smaller than a signal strength $A(x_1)$ of a determined second sample at a following second position $x_1$ and the signal strength $A(x_1)$ of said second sample is smaller than a signal strength $A(x_2)$ of a determined third sample at a following third position $x_2$, estimate the position of said peak to be:

$$x_0 + \frac{1}{2}\left[\frac{A(x_1)}{A(x_1) + A(x_0)}\right] \text{ chips.}$$

21. Apparatus according to claim 18, wherein said pulse has a width of about two chips, wherein a sampling rate is two samples per chip, and wherein said processing component is configured to, in case a signal strength $A(x_0)$ of a determined sample at a first position $x_0$ is larger than a signal strength $A(x_1)$ of a determined second sample at a following second position $x_1$, estimate the position of said peak to be:

$$x_0 + \frac{1}{2}\left[\frac{A(x_1) - A(x_{-1})}{A(x_1) + A(x_{-1})}\right] \text{ chips,}$$

wherein $A(x_{-1})$ is a signal strength of a determined third sample preceding said first sample at a third position $x_{-1}$.

22. Apparatus according to claim 17, wherein said processing component is configured to perform a weighting of the signal strengths of samples used in said interpolation before said interpolation based on known deviations between said model of said pulse shape and a real pulse shape.

23. Apparatus according to claim 17, wherein said Processing component is configured to perform a correction of a position determined based on said interpolation based on known deviations between said model of said pulse shape and a real pulse shape and based on the signal strengths of said samples.

24. Apparatus according to claim 11, wherein said determination component is configured to determine consecutive samples as said at least three samples.

25. Apparatus comprising:

means for taking samples of a received signal, wherein a position of a peak of a pulse in said signal is to be determined;

means for determining at least three samples, of which at least one has a signal strength exceeding a threshold value; and means for determining the position of said pulse peak based on an interpolation of at least two of said determined samples, which at least two samples are selected based on the signal strengths of said at least three determined samples. and which interpolation includes an evaluation of the signal strength of said at least two samples, wherein different types of equations for said interpolation are provided for different distributions of the signal strengths of said at least three determined samples.

* * * * *

UNITED STATES PATENT AND TRADEMARK OFFICE
CERTIFICATE OF CORRECTION

PATENT NO.        : 7,466,752 B2
APPLICATION NO.   : 10/727152
DATED             : December 16, 2008
INVENTOR(S)       : Qin Zhengdi Page 1 of 1

It is certified that error appears in the above-identified patent and that said Letters Patent is hereby corrected as shown below:

In column 9, line 17 (claim 20, line 4), "A" should be --$A(x_o)$--.

In column 10, line 8 (claim 23, line 1), "Processing" should be --processing--.

Signed and Sealed this

Tenth Day of March, 2009

JOHN DOLL
*Acting Director of the United States Patent and Trademark Office*